(12) United States Patent
Chanez et al.

(10) Patent No.: US 9,494,077 B2
(45) Date of Patent: Nov. 15, 2016

(54) GAS TURBINE ENGINE COMPRISING THREE ROTARY BODIES

(75) Inventors: Philippe Gérard Chanez, Paris (FR); Lamine M'Bengue, Vert Saint Denis (FR)

(73) Assignee: SNECMA, Paris (FR)

(*) Notice: Subject to any disclaimer, the term of this patent is extended or adjusted under 35 U.S.C. 154(b) by 437 days.

(21) Appl. No.: 14/122,777

(22) PCT Filed: May 31, 2012

(86) PCT No.: PCT/FR2012/051218
§ 371 (c)(1),
(2), (4) Date: Nov. 27, 2013

(87) PCT Pub. No.: WO2012/164228
PCT Pub. Date: Dec. 6, 2012

(65) Prior Publication Data
US 2014/0105737 A1    Apr. 17, 2014

(30) Foreign Application Priority Data

May 31, 2011    (FR) ...................................... 11 54729

(51) Int. Cl.
| | | |
|---|---|---|
| *F02C 7/04* | (2006.01) | |
| *F02C 3/067* | (2006.01) | |
| *F02K 3/06* | (2006.01) | |
| *F02K 3/072* | (2006.01) | |

(52) U.S. Cl.
CPC ................. *F02C 7/04* (2013.01); *F02C 3/067* (2013.01); *F02K 3/06* (2013.01); *F02K 3/072* (2013.01); *F05D 2220/323* (2013.01); *F05D 2220/3213* (2013.01); *Y02T 50/671* (2013.01)

(58) Field of Classification Search
CPC .................................. F02C 3/067; F01D 5/03
See application file for complete search history.

(56) References Cited

U.S. PATENT DOCUMENTS

| 3,903,690 A | * | 9/1975 | Jones | ...................... F02C 3/067 184/6.11 |
|---|---|---|---|---|
| 2004/0060279 A1 | * | 4/2004 | Robert Joseph | .......... F01D 1/24 60/226.1 |
| 2005/0226720 A1 | * | 10/2005 | Harvey | ..................... F01D 5/03 415/198.1 |
| 2005/0241292 A1 | * | 11/2005 | Taylor | ...................... F01D 1/26 60/226.1 |
| 2006/0093466 A1 | * | 5/2006 | Seda | ......................... F01D 1/24 415/68 |

FOREIGN PATENT DOCUMENTS

| EP | 1 577 491 | 9/2005 |
|---|---|---|
| GB | 2 408 072 | 5/2005 |

OTHER PUBLICATIONS

International Search Report Issued Sep. 19, 2012 in PCT/FR12/051218 Issued May 31, 2012.

* cited by examiner

*Primary Examiner* — Woody Lee, Jr.
(74) *Attorney, Agent, or Firm* — Oblon, McClelland, Maier & Neustadt, L.L.P.

(57) ABSTRACT

A gas turbine engine for propelling an aircraft, including a low pressure rotary body including low pressure turbine rotor blades, an intermediate rotary body including intermediate turbine rotor blades, a high pressure rotary body including high pressure turbine rotor blades, an air flow flowing through the engine from upstream to downstream. The at least one intermediate turbine rotor blade is followed directly downstream by a low pressure turbine rotor blade so as to straighten air flow deflected by the intermediate turbine rotor blade.

9 Claims, 4 Drawing Sheets

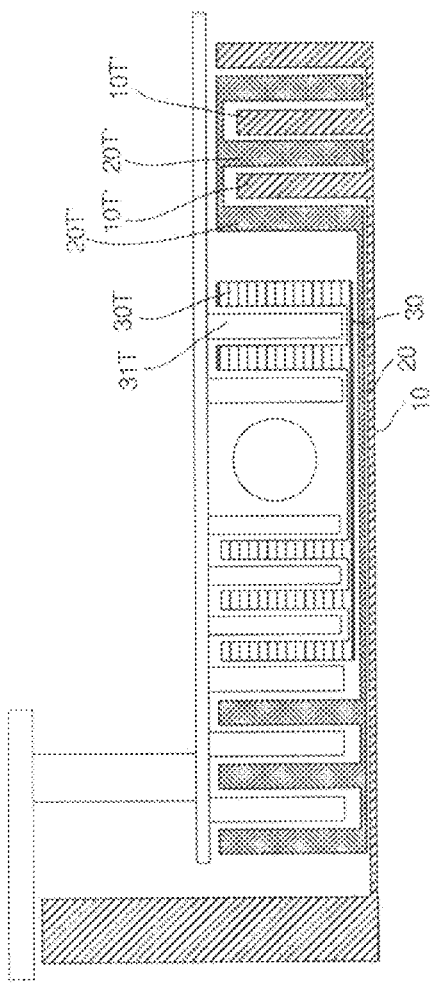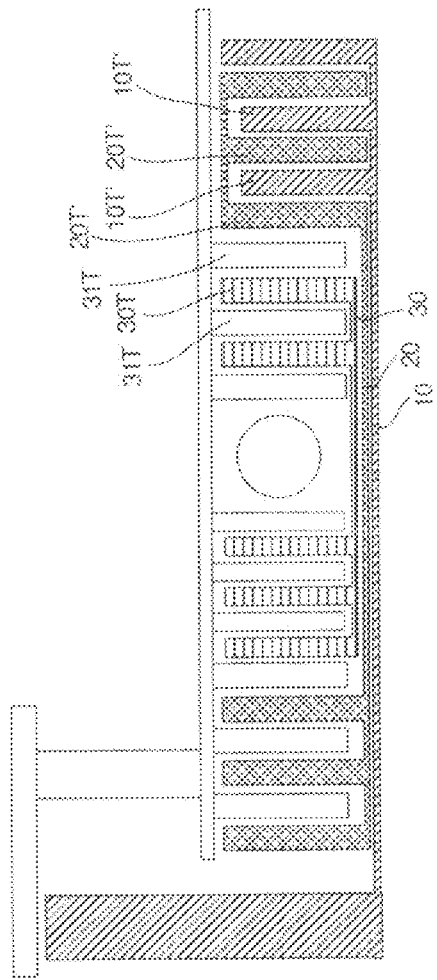

GAS TURBINE ENGINE COMPRISING THREE ROTARY BODIES

BACKGROUND OF THE INVENTION

Field of the Invention

The present invention relates to the field of gas turbine engines for propelling an aircraft.

Description of the Related Art

In the following, the terms "upstream" and "downstream" are defined in relation to the flow direction of the air flow in the engine. A gas turbine engine conventionally comprises, from upstream to downstream, a low-pressure compressor, a high-pressure compressor, a combustion chamber, a high-pressure turbine and a low-pressure turbine. To this end the engine comprises a low-pressure spool supporting compressor and turbine rotor blades and a high-pressure spool supporting compressor and turbine rotor blades. Upstream, the low-pressure compressor comprises, in a known manner, large rotor blades known to a person skilled in the art as a "fan".

One of the ways to limit the fuel consumption of the engine is to reduce the rotational speed of the fan blades in order to increase the bypass ratio of the engine, that is to say, the ratio between the air mass of the bypass flow (air mass displaced by the fan and not passing through the combustion chamber) and the air mass of the hot flow (air mass passing through the combustion chamber). As indicated above, the fan blades and the low-pressure turbine rotor blades are rigidly connected to the low-pressure spool of the engine. Consequently, a reduction in the speed of the fan blades brings about a reduction in the speed of the low-pressure turbine blades. Such a solution affects the performance of the turbine of the engine, and this is not desirable. In order to eliminate this drawback, it has been proposed to uncouple the rotation of the fan blades from the rotation of the low-pressure turbine blades such that their rotational speeds are different.

A first uncoupling solution consists in providing a torque reducer between the low-pressure turbine and the fan. Without mentioning its high mass, a torque reducer must dissipate a large amount of thermal energy, and this can have drawbacks in terms of reliability.

A second uncoupling solution consists in providing, in addition to the low-pressure and high-pressure spools, an intermediate spool which allows the speed of the fan blades, which are rigidly connected to the low-pressure spool, to be made independent of the speed of the low-pressure turbine rotor blades, which are rigidly connected to the intermediate spool. By definition, a spool comprises a shaft on which compressor rotor blades and turbine rotor blades are mounted. Each rotor blade of a spool is associated in the engine with a stator blade, mounted upstream of said rotor blade, the purpose of which is to straighten the air flow which has been deflected by the rotor blade. As shown in FIG. 1, a triple-spool engine comprises, in a known manner, a low-pressure rotary body 100, an intermediate rotary body 200 and a high-pressure rotary body 300, which respectively comprise compressor rotor blades 100C, 200C, 300C associated with compressor stator blades 101C, 201C, 301C and turbine rotor blades 100T, 200T, 300T associated with turbine stator blades 101T, 201T, 301T. Such an engine has a large mass and is very long, which has drawbacks in terms of dimensions and mass, and this limits fuel savings.

BRIEF SUMMARY OF THE INVENTION

In order to eliminate at least some of these drawbacks, the invention relates to a gas turbine engine which allows uncoupling of the fan and the low-pressure turbine, the mass and dimensions of which engine are reduced.

To this end, the invention relates to a gas turbine engine for propelling an aircraft, comprising a low-pressure spool comprising low-pressure turbine rotor blades, an intermediate spool comprising intermediate turbine rotor blades, a high-pressure spool comprising high-pressure turbine rotor blades, an air flow flowing through the engine from upstream to downstream, in which engine at least one intermediate turbine rotor blade is followed directly downstream by a low-pressure turbine rotor blade so as to straighten the air flow deflected by the intermediate turbine rotor blade.

Advantageously, the triple-spool engine according to the invention comprises no or very few intermediate turbine stator blades for straightening the air flow deflected by an intermediate turbine rotor blade. It is a low-pressure turbine rotor blade which straightens the deflected air flow. Since the number of intermediate turbine stator blades is limited, the length of the engine and its mass are limited, and this is very advantageous. An engine according to the invention also has all the advantages of a conventional triple-spool engine. The speed of the low-pressure turbine rotor blades (such as the fan blades) is independent of the speed of the intermediate turbine rotor blades which are rigidly connected to the intermediate spool. The speed of the fan can thus advantageously be reduced without affecting the performance of the turbine of the engine.

Preferably, the low-pressure spool and the intermediate spool are contra-rotating. The relative speed between an intermediate turbine rotor blade and a low-pressure turbine rotor blade is thus high, even for spools driven in rotation at reduced speeds. A high relative speed improves the straightening of the air flow, and this is very advantageous.

Rotor blades contra-rotating at low speeds advantageously perform the same function as a high-speed rotor blade associated with a stator blade which is, by definition, stationary.

According to one aspect of the invention, at least one high-pressure turbine rotor blade is followed directly downstream by an intermediate turbine rotor blade so as to straighten the air flow deflected by the high-pressure turbine rotor blade.

Advantageously, this makes it possible to limit the number of high-pressure turbine stator blades for straightening the air flow deflected by a high-pressure turbine rotor blade. It is an intermediate turbine rotor blade which straightens the deflected air flow. Since the number of high-pressure turbine stator blades is limited, the length and the mass of the engine are reduced, which is very advantageous.

Preferably, the high-pressure spool and the intermediate spool are contra-rotating. The relative speed between an intermediate turbine rotor blade and a high-pressure turbine rotor blade is high, which improves the straightening of the air flow.

According to one aspect of the invention, the low-pressure turbine rotor blade extending radially in a given direction, the intermediate turbine rotor blade extends radially in the opposite direction. When the intermediate turbine rotor blades are oriented radially inwards, the low-pressure turbine rotor blades are oriented radially outwards. Similarly, when the intermediate turbine rotor blades are oriented radially outwards, the low-pressure turbine rotor blades are oriented radially inwards. Owing to this orientation of the blades, a very compact turbine is formed, and this is very advantageous. In addition, the straightening of the deflected air flow is improved by placing the rotor blades close to each other.

Preferably, each intermediate turbine rotor blade is followed directly downstream by a low-pressure turbine rotor blade so as to straighten the air flow deflected by the intermediate turbine rotor blade. In other words, the engine according to the invention does not comprise any intermediate turbine stator blades, and this makes it possible to limit the length and the mass of the engine to a great extent.

Preferably, said low-pressure turbine rotor blade is followed directly downstream by another intermediate turbine rotor blade so as to straighten the air flow deflected by said low-pressure turbine rotor blade. The turbine thus comprises alternating intermediate turbine rotor blades and low-pressure turbine rotor blades, and this makes it possible to form a compact engine.

According to a first aspect, a plurality of low-pressure turbine rotor blades is followed directly downstream by an intermediate turbine rotor blade so as to straighten the air flow deflected by the plurality of low-pressure turbine rotor blades. Owing to the invention, the dimensions and mass of the turboshaft engine are optimised.

According to a second aspect, at least one low-pressure turbine rotor blade is followed directly downstream by a low-pressure turbine stator blade so as to straighten the air flow deflected by the low-pressure turbine rotor blade. A low-pressure turbine stator blade advantageously makes it possible to calibrate the load of the turbine of the engine to drive the fan blades rigidly connected to the low-pressure spool.

Thus, by adding one or more low-pressure turbine stator blades among the low-pressure turbine rotor blades, the load of the turbine and its speed can be adjusted so as to obtain the desired bypass ratio, it being possible for the range of variation of the bypass ratio to be large.

BRIEF DESCRIPTION OF THE SEVERAL VIEWS OF THE DRAWING

The invention will be better understood when reading the following description given solely by way of example and with reference to the appended drawings, in which:

FIG. 3C is a schematic view of a third embodiment of a triple-spool gas turbine engine according to the invention;

FIG. 3D is a schematic view of a fourth embodiment of a triple-spool gas turbine engine according to the invention.

DETAILED DESCRIPTION OF THE INVENTION

It should be noted that the figures disclose the invention in detail in order for the invention to be implemented, but said figures can naturally serve to better define the invention if necessary.

Figure 1:
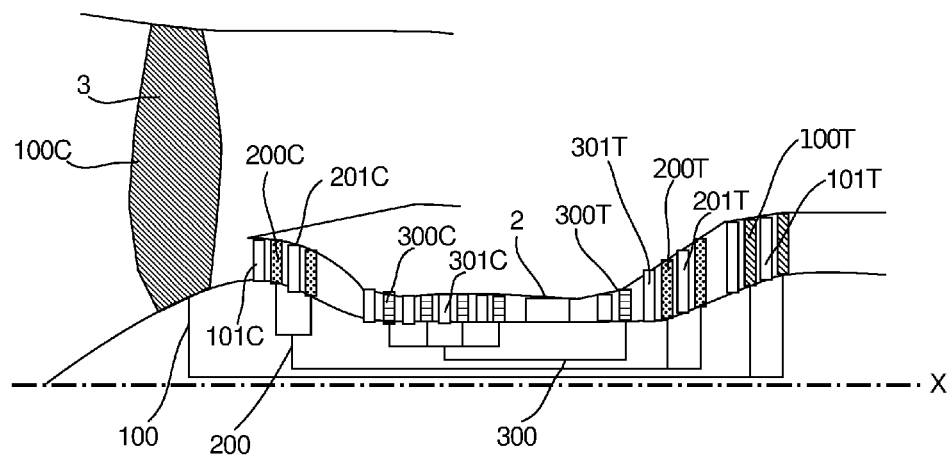
FIG. 1 is a schematic view of a triple-spool gas turbine engine according to the prior art.
Figure 2:
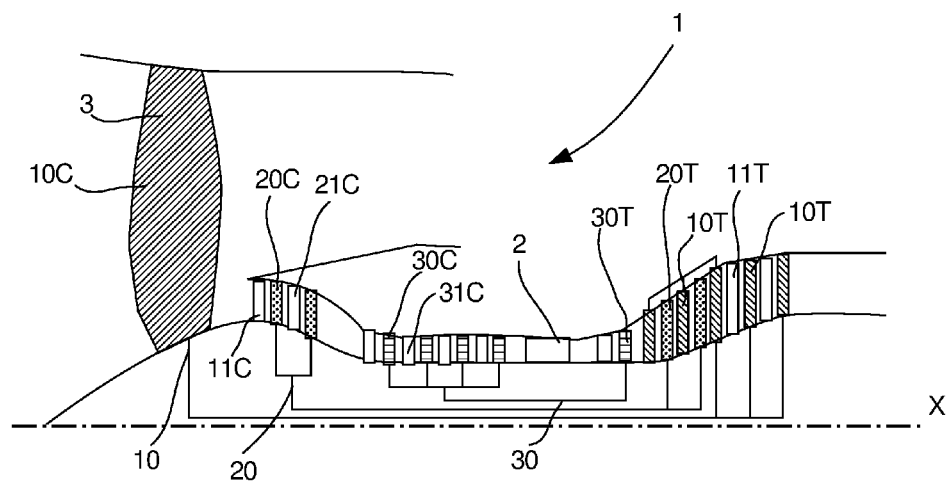
FIG. 2 is a schematic view of a triple-spool gas turbine engine according to the invention.

As shown in FIG. 2, a turboshaft engine 1 of axis X comprises a plurality of compressor stages to compress an air flow axially from upstream to downstream, a combustion chamber 2 and a plurality of turbine stages for recovering the combustion energy. The turboshaft engine 1 comprises a low-pressure rotary body 10, an intermediate rotary body 20 and a high-pressure rotary body 30, which respectively comprise compressor rotor blades 10C, 20C, 30C and turbine rotor blades 10T, 20T, 30T. Among the low-pressure compressor blades 10C, the turbocompressor 1 comprises large upstream fan blades 3. Each spool is formed of a shaft on which the compressor rotor blades and the turbine rotor blades are radially mounted. The compressor rotor blades and the turbine rotor blades of a same spool are thus driven at the same rotational speed. The spools 10, 20, 30 are coaxial with the axis X of the engine 1.

As explained above, a triple-spool turboshaft engine allows the speed of the low-pressure compressor rotor blades 10C (including the fan blades 3), which are rigidly connected to the low-pressure spool 10, to be made independent of the speed of the intermediate turbine blades 20T, which are rigidly connected to the intermediate spool 20.

Still with reference to FIG. 2, the low-pressure compressor rotor blades 10C are associated with low-pressure stator blades 11C, the intermediate compressor rotor blades 20C are associated with intermediate compressor stator blades 21C and the high-pressure compressor rotor blades 30C are associated with high-pressure compressor stator blades 31C in order to compress the air flow from upstream to downstream up to the combustion chamber 2.

The invention is directed more particularly to the turbine of the turbocompressor 1 and more particularly to the low-pressure stages of said turbine (low-pressure turbine stage and intermediate turbine stage). In contrast to a conventional triple-spool turboshaft engine, each intermediate turbine rotor blade 20T is not followed directly downstream by a stator blade, the deflected air flow being straightened by a low-pressure turbine rotor blade 10T.

According to the invention, the turboshaft engine 1 comprises at least one intermediate turbine rotor blade 20T followed directly downstream by a low-pressure turbine rotor blade 10T so as to straighten the air flow deflected by the intermediate turbine rotor blade 20T, as shown in FIG. 2. The air flow deflected by an intermediate turbine rotor blade 20T is thus not straightened by a stationary stator blade but by a low-pressure turbine rotor blade 10T. The number of stator blades is advantageously limited, which makes it possible to reduce the length of the turboshaft engine 1.

Figure 3A:
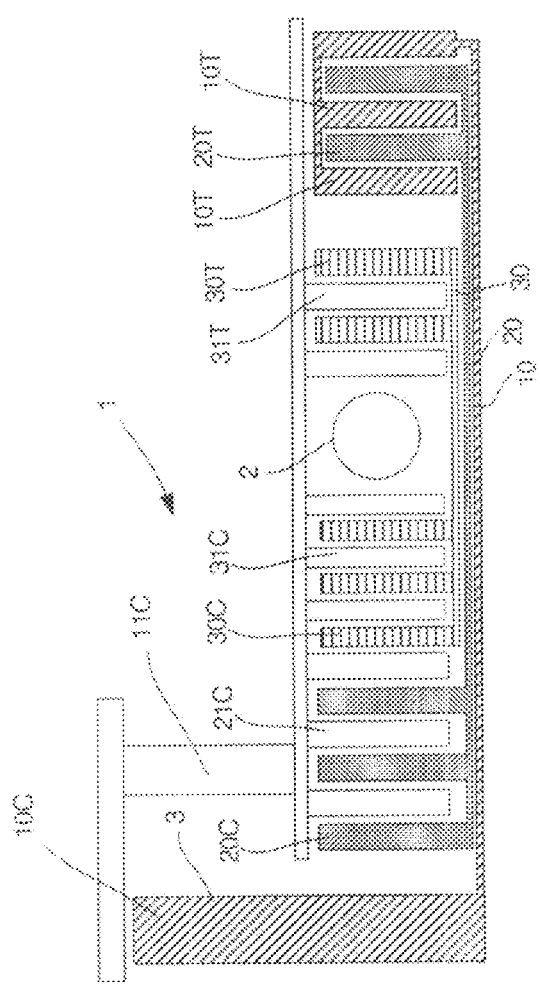
FIG. 3A is a schematic view of a first embodiment of a triple-spool gas turbine engine according to the invention.

According to a first embodiment, as shown in FIGS. 2 and 3A, the high-pressure turbine is conventional and comprises high-pressure turbine rotor blades 30T each associated with a high-pressure turbine stator blade 31T. The intermediate spool 20 comprises, in this example, two intermediate turbine rotor blades 20T while the low-pressure spool 10 comprises three low-pressure turbine rotor blades 10T, these being alternated such that the air flow from the high-pressure turbine is firstly straightened by a low-pressure turbine rotor blade 10T, directly deflected by an intermediate turbine rotor blade 20T, straightened by another low-pressure turbine rotor blade 10T and so on.

As indicated above, the intermediate spool 20 and the low-pressure spool 10 are contra-rotating so as to optimise the load of the turbine as well as the straightening of the air flow from upstream to downstream. The relative speed between an intermediate turbine rotor blade 20T and a low-pressure turbine rotor blade 10T is high, even for spools driven in rotation at reduced speeds. A high relative speed improves the straightening of the air flow, and this is very advantageous.

In the following, the terms "inward" and "outward" are defined in relation to the axis of the engine X. A radial blade extends inwards when it extends towards the axis of the engine, that is to say when the head of the blade (that is to say its free end) is closer to the axis of the engine than the root of the blade. Similarly, a radial blade extends outwards when it extends away from the axis of the engine, that is to say when the head of the blade is further away from the axis of the engine X than the root of the blade.

In a first embodiment shown in FIGS. 2 and 3A, the intermediate turbine rotor blades 20T extend radially outwards, while the low-pressure turbine rotor blades 10T extend radially inwards so as to form an exoskeleton interacting with the intermediate turbine rotor blades 20T, as shown in FIG. 3A. Such an arrangement of the blades makes it possible to limit the dimensions of the engine.

In this first embodiment, the air flow deflected by the high-pressure turbine rotor blade 30T situated furthest downstream is directly straightened by a low-pressure turbine rotor blade 10T, and this makes it possible to avoid using a stator blade and thus limits the dimensions of the engine.

Figure 3B:
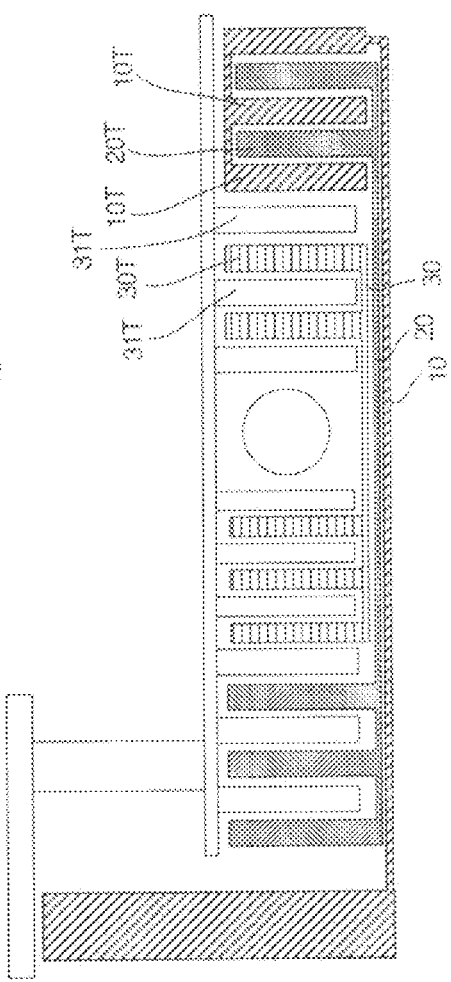
FIG. 3B is a schematic view of a second embodiment of a triple-spool gas turbine engine according to the invention.
Figure 4A:
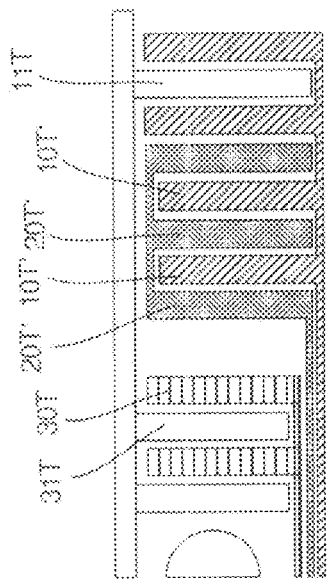
FIGS. 4A-4D are schematic views of alternatives to the embodiments in FIGS. 3A-3D respectively, with a low-pressure turbine stator blade.
Figure 4B:
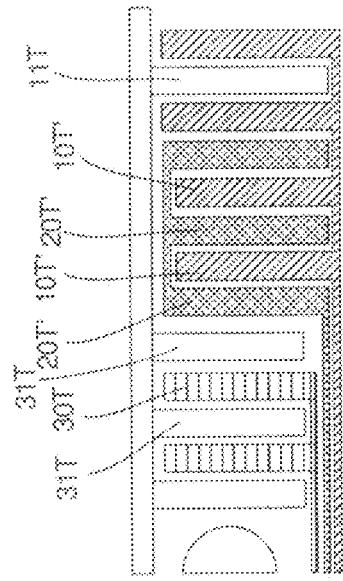
Figure 4C:
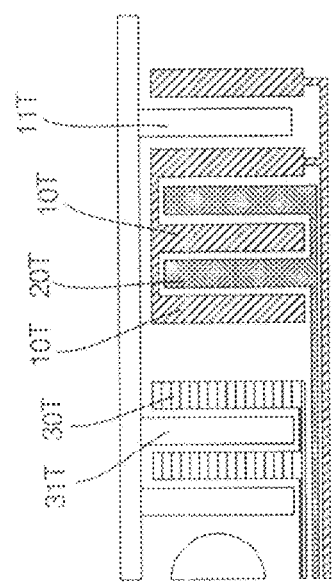
Figure 4D:
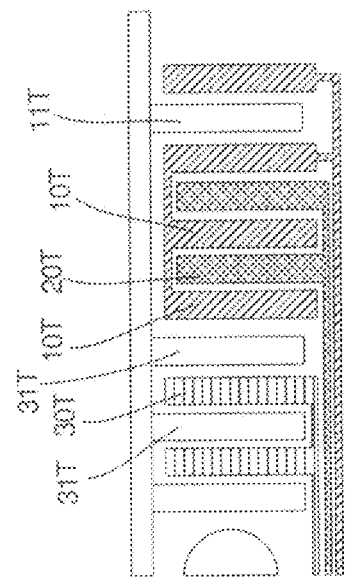

The second embodiment of the invention is identical to the first embodiment except for one difference, which is that the turbine of the turboshaft engine in the second embodiment comprises a high-pressure turbine stator blade 31T placed directly between a high-pressure rotor blade 30T and a low-pressure turbine rotor blade 10T, as shown in FIG. 3B. A high-pressure turbine stator blade 31T of this type advantageously makes it possible to control the load between the different spools and/or improve overall efficiency. A stator blade of this type can, for example, modify the gyration at the high-pressure turbine output to increase or reduce the load on the low-pressure turbine. This can also improve the overall efficiency of the engine by limiting the secondary phenomena (turbulence, etc.) at the high-pressure turbine output which reduce the efficiency of the low-pressure turbine situated downstream.

The third embodiment of the invention is similar to the first embodiment, the only difference being that the low-pressure turbine rotor blades 10T' extend radially outwards, while the intermediate turbine rotor blades 20T' extend radially inwards so as to form an exoskeleton interacting with the low-pressure turbine rotor blades 10T', as shown in FIG. 3C.

The inward or outward orientation of the low-pressure turbine rotor blades and the intermediate turbine rotor blades is thus irrelevant, the important thing being that they are oriented in opposite directions. Moreover, the low-pressure turbine rotor blades and the intermediate turbine rotor blades are alternated and contra-rotating in order to allow optimum straightening of the air flow when it flows through the turbine of the engine.

Similarly to the first embodiment, the air flow produced deflected by the high-pressure turbine rotor blade 30T of the engine according to the third embodiment is directly straightened by an intermediate turbine rotor blade 20T', and this makes it possible to avoid using a stator blade and thus limits the dimensions of the engine.

The fourth embodiment of the invention is identical to the third embodiment except for one difference, which is that the turbine of the turboshaft engine in the fourth embodiment comprises a high-pressure stator blade 31T directly between a high-pressure rotor blade 30T' and an intermediate turbine rotor blade 20T', as shown in FIG. 3D. A high-pressure stator blade 31T of this type advantageously makes it possible to control the load between the different spools and/or improve overall efficiency. It has an effect more particularly on the load and the efficiency of the turbine of the intermediate spool.

In the embodiments of the engine shown in FIGS. 3A-3D, the intermediate turbine rotor blades and the low-pressure turbine rotor blades are alternated and contra-rotating in order to straighten the air flow flowing through the turbine, no low-pressure turbine stator blades or intermediate turbine stator blades being mounted in the turbine in order to limit optimally the dimensions and the mass of the engine.

Alternatively, the turbine of the engine 1 may comprise one or more low-pressure stator blades 11T placed directly between two low-pressure turbine rotor blades 10T, 10T', as shown in FIGS. 4A-4D, respectively showing alternatives to the embodiments shown in FIGS. 3A-3D. The number of low-pressure turbine stator blades 11T advantageously makes it possible to parameterise the desired load of the low-pressure turbine and thus of the fan rigidly connected to the low-pressure spool 30.

Thus, by adding one or more low-pressure stator blades 11T, it is possible to calibrate the speed and the load of the turbine so as to calibrate precisely the bypass ratio of the engine.

Owing to the invention, it is possible to benefit from all the advantages of a conventional triple-spool turboshaft engine while limiting the length and the mass of the engine. Such optimisations advantageously make it possible to reduce the fuel consumption of the engine.

The invention claimed is:

1. A gas turbine engine for propelling an aircraft, comprising:
    a low-pressure spool comprising a low-pressure turbine with low-pressure turbine rotor blades and fan blades rotating together such that the fan blades are driven in rotation by the low-pressure turbine;
    an intermediate spool comprising an intermediate turbine with intermediate turbine rotor blades and intermediate compressor blades in a core of the gas turbine engine rotating together such that the intermediate compressor blades are driven in rotation by the intermediate turbine; and
    a high-pressure spool comprising a high-pressure turbine with high-pressure turbine rotor blades and high-pressure compressor blades rotating together such that the high-pressure compressor blades are driven in rotation by the high-pressure turbine,
    wherein an air flow flows through the gas turbine engine from upstream to downstream,
    wherein a rotation speed of the fan blades is independent of a rotation speed of the intermediate turbine rotor blades,
    wherein at least one intermediate turbine rotor blade is followed directly downstream by a low-pressure turbine rotor blade so as to straighten air flow deflected by the intermediate turbine rotor blade, and
    wherein at least one high-pressure turbine rotor blade is followed directly downstream by an intermediate turbine rotor blade so as to straighten air flow deflected by the high-pressure turbine rotor blade.

2. An engine according to claim 1, wherein the low-pressure spool and the intermediate spool are contra-rotating.

3. An engine according to claim 1, wherein the high-pressure spool and the intermediate spool are contra-rotating.

4. An engine according to claim 1, wherein each intermediate turbine rotor blade is followed directly downstream by a low-pressure turbine rotor so as to straighten air flow deflected by the intermediate turbine rotor blade.

5. An engine according to claim 1, wherein the low-pressure turbine rotor blade is followed directly downstream by another intermediate turbine rotor blade so as to straighten air flow deflected by the low-pressure turbine rotor blade.

6. An engine according to claim 1, wherein a plurality of low-pressure turbine rotor blades is followed directly downstream by an intermediate turbine rotor blade so as to straighten air flow deflected by the plurality of low-pressure turbine rotor blades.

7. An engine according to claim 1, wherein at least one low-pressure turbine rotor blade is followed directly downstream by a low-pressure turbine stator blade so as to straighten air flow deflected by the low-pressure turbine rotor blade.

8. An engine according to claim 1, wherein the low-pressure turbine rotor blade extends radially in a first direction, and the intermediate turbine rotor blade extends radially in a second opposite direction.

9. An engine according to claim 1, wherein the engine includes only one set of fan blades.

\* \* \* \* \*